United States Patent [19]

Cook et al.

[11] Patent Number: 5,086,343
[45] Date of Patent: Feb. 4, 1992

[54] METHOD AND APPARATUS FOR COMPENSATING FOR SENSITIVITY VARIATIONS IN THE OUTPUT OF A SOLID STATE IMAGE SENSOR

[75] Inventors: William A. Cook; Kenneth A. Parulski; Lionel J. D'Luna, all of Rochester, N.Y.

[73] Assignee: Eastman Kodak Company, Rochester, N.Y.

[21] Appl. No.: 522,334

[22] Filed: May 11, 1990

[51] Int. Cl.$^5$ .................... H04N 3/14; H04N 5/335
[52] U.S. Cl. .......................... 358/213.15; 358/213.18
[58] Field of Search ................. 358/213.15, 213.16, 358/213.18

[56] References Cited

U.S. PATENT DOCUMENTS

| | | | |
|---|---|---|---|
| 3,800,078 | 3/1974 | Cochran et al. | 358/213.15 |
| 4,216,503 | 8/1980 | Wiggins . | |
| 4,343,021 | 8/1982 | Frame . | |
| 4,486,781 | 12/1984 | Wilmer et al. . | |
| 4,602,277 | 7/1986 | Guichard . | |
| 4,602,291 | 7/1986 | Temes . | |
| 4,698,685 | 10/1987 | Beaverson | 358/213.15 |
| 4,731,661 | 3/1988 | Nagano . | |
| 4,760,464 | 7/1988 | Sakano . | |
| 4,839,729 | 6/1989 | Ando et al. | 358/213.16 |
| 4,903,316 | 2/1990 | Hongo et al. | 358/464 |
| 4,912,558 | 3/1990 | Easterly et al. | 358/213.16 |
| 4,970,598 | 11/1990 | Vogel | 358/213.18 |
| 4,979,042 | 12/1990 | Vogel | 358/213.18 |

Primary Examiner—Howard W. Britton
Assistant Examiner—Wendy R. Greening
Attorney, Agent, or Firm—David M. Woods

[57] ABSTRACT

A correction circuit processes digitized signals from an image sensor and generates gain correction values to compensate for variations in the output of the sensor. While imaging a gain calibration object, the sensor is operated in a calibration mode in which a plurality of calibration values are generated that pertain to each photosite. The digitized calibration values are transformed into log space for processing by a gain level averaging circuit. The log calibration signals are first subtracted from a reference corresponding to a maximum expected signal value. The difference signals are serially accumulated by means of pair of registers and an adder, and the sum is stored in a gain memory. In a subsequent normal operating mode, the summed signals for each photosite are retrieved from the gain memory and bit-shifted to form an average correction value for each photosite. The correction values are applied to an adder in synchronism with sensor signals from like photosites and added therewith in log space to provide gain compensation.

5 Claims, 1 Drawing Sheet

METHOD AND APPARATUS FOR COMPENSATING FOR SENSITIVITY VARIATIONS IN THE OUTPUT OF A SOLID STATE IMAGE SENSOR

BACKGROUND OF THE INVENTION

1. Field of the Invention

This invention relates to signal processing of image signals from an image sensor, and more particularly, to a method and apparatus for generating correction values to account for variations in the sensitivity of different photosites on a solid state image sensor.

2. Description Relative to the Prior Art

Variations in photodiode dark current and sensitivity as well as light source non-uniformities can cause noticeable degradation in the quality of scanned images from a solid state sensor. These variations can be compensated by calibrating the system with no illumination upon the sensor to determine an average black level, and by calibrating the system with the sensor under full illumination to determine an average maximum (white) value. It is further well known to perform a calibration with regard to each sensor photosite, as shown in the following two examples. In U.S. Pat. No. 4,602,291, the "dark current" from the imager array (i.e., the signal obtained when no light strikes the array) is directed via an analog/digital converter to an offset memory, which stores the dark current charge from each photosite in digital form. The offset value is subsequently processed with a white level value from each photosite (i.e., the signal obtained when a uniform illumination strikes the imager) and the difference thereof is stored in a gain memory for each photosite. In U.S. Pat. No. 4,760,464, a white value for each picture element is obtained by scanning a white substrate a plurality of times and storing the data obtained for each scan, and constantly replacing a previous white value by a present white value when the present value is greater than the previous level. Correction is then effected using the maximum values.

In the calibration mode described in U.S. Pat. No. 4,343,021, the sensor is presented with a field of uniform brightness. As a particular sensor element is scanned, the raw video signal is applied to a multiplier and multiplied by a correction coefficient. A comparator then decides whether the real time, processed multiplier signal is greater or less than a reference signal. A register, which temporarily stores the correction coefficient, is then either incremented or decremented and the adjusted correction coefficient value is returned to its memory location. The next time the image element is scanned, the coefficient is again drawn from memory and applied to both the multiplier and the indexing register, and the aforementioned process is repeated. After many further passes, the correction coefficient is altered in such a way that the processed video data approaches the reference signal.

Each of the aforementioned systems have certain disadvantages. The first system, disclosed in the '291 patent, calculates coefficients from only one scan. Such data may, however, contain errors caused by dust particles or surface flaws on the reference object. The second reference, the '464 patent, scans a plurality of times but skews every adjustment toward the maximum variation observed, in effect tending to clamp to the largest noise signal. The latter reference, the '021 patent, achieves a convergence toward a reference value but at the expense of a relatively complex system involving multipliers and comparators.

SUMMARY OF THE INVENTION

Unlike the approaches taken by the prior art, we have found certain advantages in doing as much of the calibration as possible in a logarithmically-quantized signal space. For one thing, a multiplication step becomes a simple addition. This is of more than passing significance when it is realized that such circuits are desirably implemented in a digital integrated circuit, where multipliers are large and, compared to adders, consume a large area on the chip. Moreover, any chip-saving simplification reduces cost and encourages ordinarily complex features like element-by-element correction.

As a result, a correction circuit implemented according to the invention provides compensation for illumination and sensitivity variations appearing in image values on an element-by-element basis. That is, a plurality of sample values are generated from each photosite while the image sensor images an object of uniform transmittance (or reflectance). The calibration values are then converted to logarithmic calibration signals. A logarithmic correction value is generated for each photosite from the plurality of logarithmically-quantized calibration signals corresponding to each photosite. The correction values are then stored and, when the image sensor is scanning a normal object, the resultant image values are altered by applying the stored correction values to the scanned image values. Each correction value therefore pertains to the photosite producing the image value. In a specific embodiment of the invention, the correction values are based upon an average of the plurality of logarithmic calibration signals corresponding to each photosite and each alteration is completed by adding the log correction value to the log image value.

BRIEF DESCRIPTION OF THE DRAWINGS

The invention will be described with reference to the drawing, which shows a block diagram of a video correction circuit according to the invention.

DETAILED DESCRIPTION OF THE INVENTION

Figure 1:
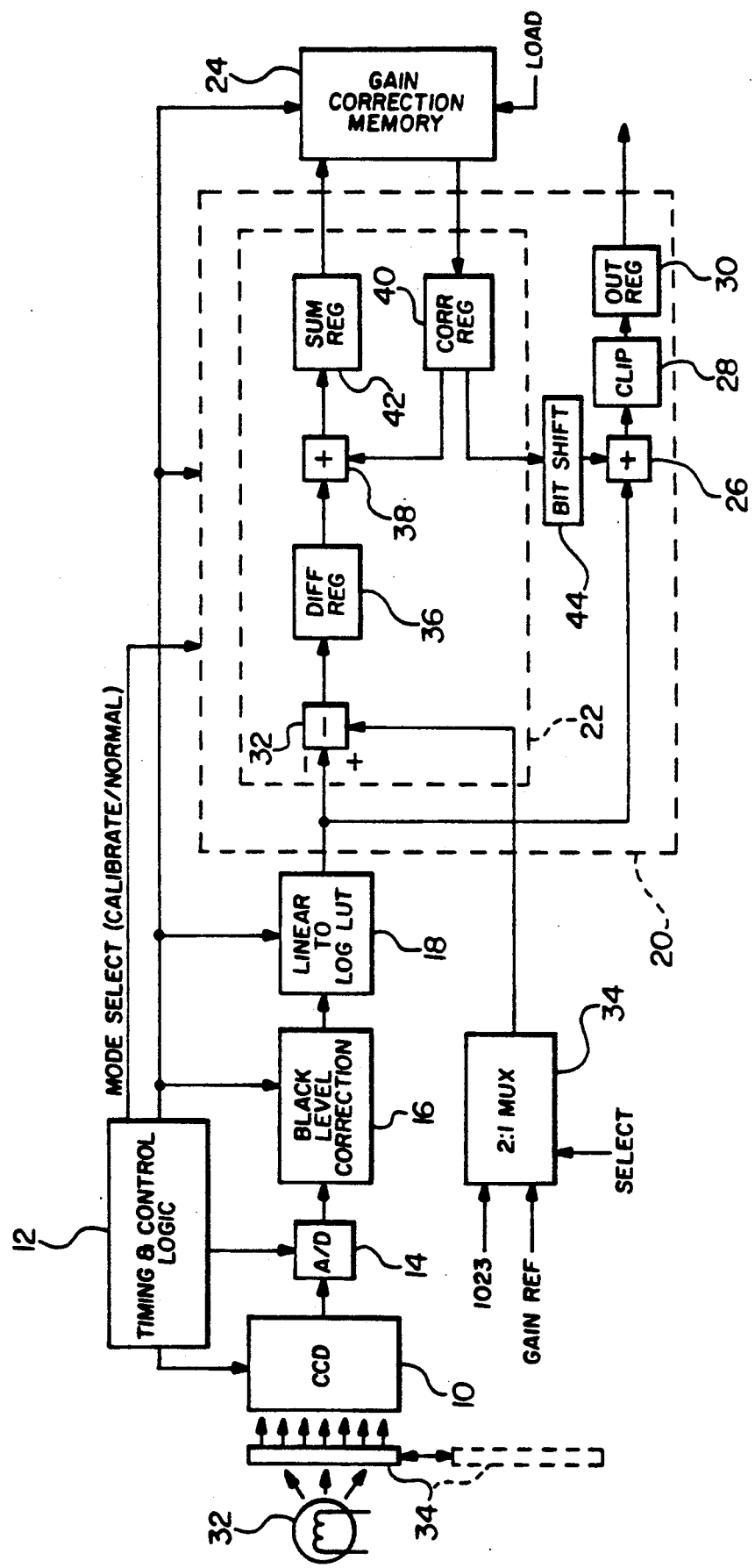

A generic electronic imaging system is shown in part in the FIGURE to illustrate a typical application of the invention, but it will be readily understood that the present invention can be employed with any type of photoelectronic scanning system that exhibits sensitivity variations due to such factors as photosite variability or light source non-uniformity. The latter is a particular problem where the system itself provides illumination for scanning an object, such as provided by a linear scanner for illuminating a film transparency. Furthermore, the present description will be directed in particular only to elements forming part of, or cooperating more directly with, the present invention. Elements of the scanning system not specifically shown or described herein may be selected from those known in the art.

The electronic imaging system shown in the FIGURE includes a charge-coupled device (CCD) image sensor 10 driven by clock signals from a timing and control logic section 12. The output of the image sensor is a sequence of light values bearing the aforementioned variations due to imager sensitivity variations and/or light source non-uniformity. The light values are digitized by an analog-to-digital converter 14 and applied to a black level correction circuit 16. The circuit 16 includes a conventional black reference generator and a conventional black reference clamp, which are used to establish a stable sensor black reference value for the entire image. The black reference is an average thermal dark current noise correction offset value for the sensor, which, unless removed from the signals, will corrupt all subsequent adjustments and corrections. The black reference circuit 16 is initially enabled by the timing and control logic section 12 to collect a sample of dark current signal values and to calculate the average black reference therefrom. As the light values are subsequently processed, the average black reference value is subtracted from each light value in the circuit 16.

The output of the black level correction circuit 16 is transformed into a logarithmically quantized space by a linear-to-log ROM look up table 18. The logarithmic signals are then applied to a gain correction circuit 20. Gain correction operates in two modes: a calibration mode and a normal mode. The image sensor 10 is accordingly driven to provide either a sequence of calibration values (during the calibration mode) while the photosites are subject to uniform illumination or a sequence of image values (during the normal mode) while the photosites are subject to object illumination. The gain control circuit 20 is operated by a "mode select" signal from the timing and control logic section 12 to accordingly process the pixel values. The gain correction values for the photosites are first computed in a gain level averaging circuit 22 and stored in a gain correction memory 24 in the calibration mode. In the normal mode, the gain correction values are read from the gain correction memory 24 and added to the image value in a correction adder 26. The corrected image values are processed by the clipping circuit 28 and latched into the output register 30. Since the addition by the adder 26 is being performed in log space, the image values are being scaled in a multiplication-type operation.

During the calibration mode, the average of the ratio of the maximum expected signal value to the sensor output under full illumination is calculated. The correction values are computed in the gain correction circuit 20 by averaging a plurality of values from each photosite on the sensor 10 with the sensor illuminated by a light source 32 through a defocused "Dmin" filter 34, that is, a filter having a density corresponding to the minimum density of a nominal transparency material, which serves as a gain calibration object. (Alternatively, the gain calibration object could be a clear "open gate" opening to the illumination source, or could be a uniform substrate when scanning reflection materials.) More particularly, 256 values from each photosite are averaged. The averaging is completed in two stages. First, each logarithmic signal from the log look-up table 18 is applied to a subtractor 32 to obtain the log difference (i.e., the ratio in linear space) with a log reference value provided by a multiplexer 34. The subtracted value, which is latched into a difference register 36, represents the difference between the "desired" log space gain calibration signal level and the actual log space gain calibration signal level or, in linear space, the ratio of these two quantities. In the second stage of the averaging process, the difference value in the difference register 36 is applied to the adder 38 which sums the difference value with a "running sum" value from a correction register 40. The summed result is latched into a sum register 42.

The reference value is selected by the multiplexer 34 from either a reference decimal value of 1023 or a programmable value "GAINREF" supplied by an external processor (not shown). The ordinary, and default, reference value is 1023 (which relates to a 10 bit input to the subtractor 32 from the look up table 18). By choosing the reference value to be 1023, the value stored in the difference register 36 will always be positive, so the subsequent "running average" value will always be a positive value. With the present embodiment, if the programmable reference "GAINREF" is selected, the user must ensure that the signal levels from the sensor do not exceed the reference value, since the gain averaging circuit 22 is specifically designed to add only positive gain reference values. (It should be understood, however, that the circuit could be modified in known ways to handle negative values as well as positive values. Likewise, the reference value relates directly to the bit capacity of the circuit, and will be different for different bit length inputs.)

The gain correction memory 24 interfaces with the correction register 40 and the sum register 42, writing into the correction register 40 and reading from the sum register 42. The memory 24 needs to be addressed by the logic section 12 so that the proper "running sum" correction value is loaded into the correction register 40 at the proper time, and the resulting "sum" value from the sum register 40 is written back into the same memory location in the gain correction memory 24. In this manner the new sum value overwrites the previous "running sum" value for the particular photosite. Once the correction values for each sensor photosite from 256 calibration-mode repetitions have been summed, the output of the correction register 40 will equal the proper gain correction sums, and the gain calibration mode is complete.

In the normal mode of operation, the gain calibration object 34 is removed from the light path and the normal object to be scanned is inserted into the light path. The gain corrections stored in the gain correction memory 24 for each photosite in the image sensor 10 are accessed as each corresponding image value is applied to the correction adder 26. Accordingly, a unique gain correction for each photosite is used to alter (by adding to, or, in linear space, multiplying with) the image value developed for that photosite. In the preferred practice of the invention, the gain adder 38 combines a 10 bit difference value from the difference register 36 with a 16 bit "running sum" value from the correction register 40, providing a 16 bit sum to the sum register 42. Consequently, the 8 most significant bits (MSBs) of the "running sum" values represents, after 256 adds, the proper gain correction value, that is, the average of 256 adds. In the normal mode of operation, only the 8 MSBs need to be applied from the memory 24. The averaging is obtained by the bit shift circuitry 44, which represents the appropriate hard-wiring between the correction register 40 and the adder 26 to accomplish an 8 bit shift.

In the preferred embodiment, the correction signals are limited to a maximum value of ¼ of the full range density signal, which corresponds to 0.75 density units. This is because an 8 bit correction value is combined with a 10 bit image value in the correction adder 26, and correction values greater than ¼ of the full range image value will overflow the gain averaging circuit 22. Moreover, the log calibration values input during the calibration mode must not differ from the value provided by the multiplexer 34 by more than 256 code values. Obviously, these limitations are not aspects of the invention, but of the particular circuit used to implement the invention.

The invention has been described in detail with particular reference to a presently preferred embodiment, but it will be understood that variations and modifications can be effected within the spirit and scope of the invention.

What is claimed is:

1. A correction circuit for generating correction values to compensate for variations appearing in image values derived from an image sensor having a plurality of discrete photosites, said sensor operable in a calibration mode to produce a plurality of calibration values from each photosite while the sensor images a gain calibration object, said circuit comprising:
   means for converting the calibration values to logarithmic calibration signals;
   means for subtracting each log calibration signal from a reference value corresponding to a maximum expected signal value to generate positive log calibration signals;
   means for generating a logarithmic correction value for each photosite from the average of the plurality of positive logarithmic calibration signals corresponding to each photosite;
   means for storing said logarithmic correction values; and
   means for applying said stored correction values to the alteration of the image values whereby each correction value pertains to the photosite producing the image value.

2. A correction circuit for generating correction values to compensate for variations appearing in image values derived from an illuminated image sensor having a plurality of discrete photosites, said sensor operable in a calibration mode to produce a plurality of calibration values from each photosite while the sensor images a gain calibration object and operable in a normal mode to produce image values from the photosites while the sensor is subject to object illumination, said circuit comprising:
   means for converting the calibration values and the image values to logarithmic calibration signals and logarithmic image signals, respectively; 'means for generating a running sum of the logarithmic calibration signals corresponding to each photosite;
   means for generating a logarithmic correction value for each photosite from the running sum of all of the logarithmic calibration signals corresponding to each photosite;
   a gain correction memory operable in the calibration mode for storing the running sum of the logarithmic calibration signals corresponding to each photosite and in the normal mode for storing the logarithmic correction value for each photosite;
   means operable in log space for altering the logarithmic image signals; and
   means for applying said stored correction values to said altering means whereby each correction value pertains to the photosite producing the image value.

3. A circuit as claimed in claim 2 wherein said correction value generating means bases the correction value upon an average of the running sum of all the logarithmic calibration signals corresponding to each photosite, generating therefrom an average correction value.

4. A circuit as claimed in claim 3 wherein said altering means adds the average correction value to each image value.

5. A circuit as claimed in claim 2 wherein said correction value generating means includes means for subtracting each log calibration signal from a reference value corresponding to a maximum expected signal value and means for generating said running sum from the resultant signals.

* * * * *